United States Patent
Hattori

(10) Patent No.: US 9,515,301 B2
(45) Date of Patent: Dec. 6, 2016

(54) COIN BATTERY HAVING A SEALING PLATE WHICH SUPPRESSES DEFORMATION

(71) Applicant: PANASONIC CORPORATION, Osaka (JP)

(72) Inventor: Yasuhisa Hattori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 238 days.

(21) Appl. No.: 14/236,241

(22) PCT Filed: Sep. 25, 2012

(86) PCT No.: PCT/JP2012/006094
§ 371 (c)(1),
(2) Date: Jan. 30, 2014

(87) PCT Pub. No.: WO2013/046644
PCT Pub. Date: Apr. 4, 2013

(65) Prior Publication Data
US 2014/0170472 A1    Jun. 19, 2014

(30) Foreign Application Priority Data
Sep. 30, 2011    (JP) .................................. 2011-216361

(51) Int. Cl.
*H01M 2/02*    (2006.01)
*H01M 2/04*    (2006.01)
(Continued)

(52) U.S. Cl.
CPC ............. *H01M 2/08* (2013.01); *H01M 2/0222* (2013.01); *H01M 2/0413* (2013.01)

(58) Field of Classification Search
CPC ..... H01M 2/0222; H01M 2/08; H01M 2/0413
(Continued)

(56) References Cited

U.S. PATENT DOCUMENTS

| 2001/0055715 A1* | 12/2001 | Bennett | H01M 2/0222 429/174 |
| 2003/0134191 A1* | 7/2003 | Buckle | H01M 2/0222 429/176 |

(Continued)

FOREIGN PATENT DOCUMENTS

| CN | 103370809 A | 10/2013 |
| EP | 1320136 A1 | 6/2003 |

(Continued)

OTHER PUBLICATIONS

International Search Report issued in PCT/JP2012/006094, dated Dec. 25, 2012, with English translation, 4 pages.

(Continued)

*Primary Examiner* — Sean P Cullen
(74) *Attorney, Agent, or Firm* — McDermott Will & Emery LLP

(57) ABSTRACT

Disclosed is a coin battery including: positive and negative electrodes, a separator interposed therebetween, and an electrolyte; and a housing accommodating these elements. The housing includes: a cylindrical battery case having a bottom, and a first side wall rising from the periphery thereof; a sealing plate having a top, and a second side wall extending from the periphery of the top and along inside the first side wall; and a gasket between the first and second side walls. The sealing plate has: a first curved portion at the boundary between the top and the second side wall, a second curved portion continued from the first curved portion, a third curved portion continued from the second curved portion, and a descending portion continued from the third curved portion. The ratio: R1/R2 where R1 and R2 are outer radii of curvatures of the first and second curved portions is 0.22 to 1.88.

5 Claims, 1 Drawing Sheet

(51) Int. Cl.
*H01M 2/08* (2006.01)
*H01M 10/052* (2010.01)

(58) Field of Classification Search
USPC .................. 429/174, 163, 164, 175, 176
See application file for complete search history.

(56) References Cited

U.S. PATENT DOCUMENTS

| | | | |
|---|---|---|---|
| 2003/0186118 A1* | 10/2003 | Uyama | H01M 2/0222 |
| | | | 429/164 |
| 2010/0068614 A1 | 3/2010 | Yamaguchi et al. | |
| 2011/0223471 A1* | 9/2011 | Sato | H01M 2/0413 |
| | | | 429/172 |
| 2013/0330601 A1 | 12/2013 | Mizuta et al. | |

FOREIGN PATENT DOCUMENTS

| | | |
|---|---|---|
| JP | 08-162075 A | 6/1996 |
| JP | 2007-207534 A | 8/2007 |
| JP | 2010-073473 A | 4/2010 |
| JP | 2011-216479 A | 10/2011 |
| WO | 02-13290 A1 | 2/2002 |

OTHER PUBLICATIONS

Chinese Office Action and Search Report issued in corresponding Chinese Patent Appplication No. 201280037767.0, on Jun. 3, 2015; 9 pages with partial English translation.

\* cited by examiner

COIN BATTERY HAVING A SEALING PLATE WHICH SUPPRESSES DEFORMATION

RELATED APPLICATIONS

This application is the U.S. National Phase under 35 U.S.C. §371 of International Application No. PCT/JP2012/006094, filed on Sep. 25, 2012, which in turn claims the benefit of Japanese Application No. 2011-216361, filed on Sep. 30, 2011, the disclosures of which Applications are incorporated by reference herein.

TECHNICAL FIELD

The present invention relates to coin batteries, and specifically relates to a coin battery including an improved sealing plate, and thereby having enhanced antirust effect and resistance to electrolyte leakage.

BACKGROUND ART

Coin batteries, also known as flat batteries, are small in size and thickness, and because of this feature, are widely used for watches, keyless entries and other applications that require miniature power sources. Coin batteries are also used in memory backup for office automation (OA) devices and factory automation (FA) devices and other applications that require power sources with long operating life, and as power sources for various meters and measuring devices, and the range of application thereof is expanding. The operating environment of coin batteries is also expanding from room temperature environment to low temperature or high temperature environment.

As mentioned above, with changing circumstances surrounding coin batteries, the demand for improvement in quality of coin batteries is getting severer. There also is a stronger demand for lower price of coin batteries.

A coin battery is composed of a power generation element and a housing accommodating the power generation element. The housing includes a shallow cylindrical battery case, a sealing plate closing the opening of the battery case, and a gasket interposed between the opening end of the battery case and the rim of the sealing plate. A positive electrode and a negative electrode are disposed face to face with a separator interposed therebetween in the battery case, and an electrolyte is injected thereinto. The opening end of the battery case is then crimped onto the rim of the sealing plate, with a gasket interposed therebetween. In such a way, the interior of the housing is hermetically closed.

For the sealing plate and the battery case, stainless steel has been conventionally used. Stainless steel has high mechanical strength, and therefore, the battery case can be firmly crimped onto the rim of the sealing plate with less deformation, and the power generation element can be enclosed with excellent hermeticity.

There is recently proposed a technique of using a nickel-plated steel material, which is less expensive than stainless steel, as a material for the sealing plate. Specifically, it is reported that, by controlling the ratio of a curvature radius R of a curved portion formed around the periphery of the top of the sealing plate to an interior angle θ of the curved portion, the deformation of the sealing plate when processed can be suppressed, and the occurrence of rust on the outer side of the sealing plate and electrolyte leakage can be suppressed (see Patent Literature 1).

CITATION LIST

Patent Literature

[PTL 1] Japanese Laid-Open Patent Publication No. 2007-207534

SUMMARY OF INVENTION

Technical Problem

As mentioned above, suppression of the deformation of the sealing plate has been examined; however, the sealing plate is subjected to a large pressure when the opening end of the battery case is crimped onto the rim of the sealing plate. The deformation, therefore, is unavoidable at times. Especially when a steel material, which is lower in strength than stainless steel, is used as a material of the sealing plate, it is difficult to sufficiently suppress the deformation of the sealing plate.

Deformation of the sealing plate, if any, may cause electrolyte leakage, or cracks in the nickel plating, leading to rust of the sealing plate, when the coin battery is used in a sever vibration environment or used continuously in a high-temperature and humid environment.

In view of the above, the present invention intends to provide a highly reliable coin battery excellent in antirust effect and resistance to electrolyte leakage.

Solution to Problem

One aspect of the present invention relates to a coin battery including: a power generation element including a positive electrode, a negative electrode, a separator interposed between the positive electrode and the negative electrode, and an electrolyte; and a housing accommodating the power generation element. The housing includes: a cylindrical battery case having a bottom, and a first side wall rising from the periphery of the bottom; a sealing plate having a top, and a second side wall extending from the periphery of the top along inside the first side wall; and a gasket at least partially interposed between the first side wall and the second side wall. The sealing plate is provided with: a first curved portion formed at the boundary between the top and the second side wall, a second curved portion formed continuously from the first curved portion, a third curved portion formed continuously from the second curved portion, and a descending portion formed continuously from the third curved portion. The ratio: R1/R2 of an outer radius R1 of curvature of the first curved portion to an outer radius R2 of curvature of the second curved portion is 0.22 to 1.88.

Advantageous Effects of Invention

According to the present invention, the deformation of the sealing plate which may occur when the battery case is crimped onto the rim of the sealing plate is significantly suppressed. Therefore, the reliability of the coin battery when used in a severe environment can be improved. Moreover, even when an inexpensive steel material is used for the sealing plate, the deformation of the sealing plate is suppressed. Therefore, the production cost of the coin battery can be remarkably reduced.

While the novel features of the invention are set forth particularly in the appended claims, the invention, both as to organization and content, will be better understood and

DESCRIPTION OF EMBODIMENTS

Figure 1:
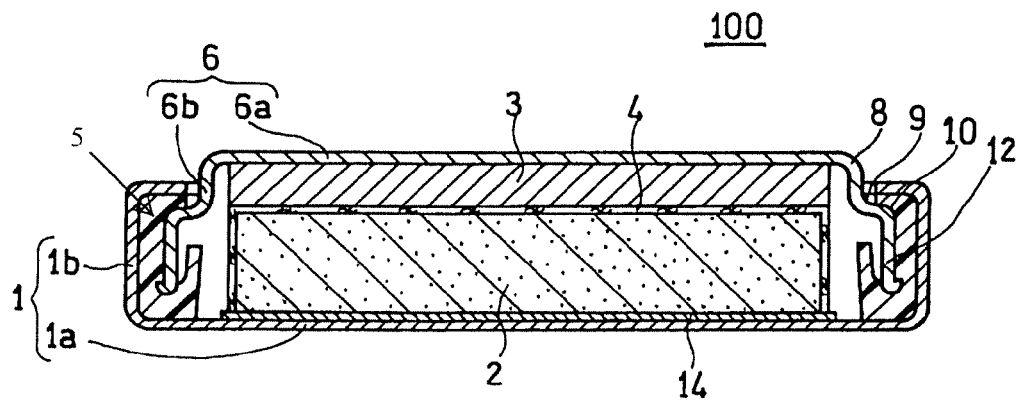
FIG. 1 A longitudinal cross-sectional view of a coin battery according to one embodiment of the present invention FIG. 2 A cross-sectional view of an essential part of a sealing plate of the coin battery according to the same embodiment FIG. 3 A cross-sectional view of an essential part of a sealing plate of a coin battery according to another embodiment of the present invention

A coin battery of the present invention includes: a power generation element including a positive electrode, a negative electrode, a separator interposed between the positive electrode and the negative electrode, and an electrolyte; and a housing accommodating the power generation element. The housing includes: a cylindrical battery case having a bottom, and a first side wall rising from the periphery of the bottom; a sealing plate having a top, and a second side wall extending from the periphery of the top along inside the first side wall; and a gasket at least partially interposed between the first side wall and the second side wall. The sealing plate is provided with: a first curved portion formed at the boundary between the top and the second side wall, a second curved portion formed continuously from the first curved portion, a third curved portion formed continuously from the second curved portion, and a descending portion formed continuously from the third curved portion.

Here, R1 and R2 are radii of curvatures of the curved surface being located at the outside of the curved portion of the sealing plate, that is, on the outside surface when the battery is composed. The sealing plate is formed such that the ratio: R1/R2 of an outer radius R1 of curvature of the first curved portion to an outer radius R2 of curvature of the second curved portion falls within the range of 0.22 to 1.88.

According to the above configuration, it is possible to more widely disperse the pressure applied to the second side wall of the sealing plate when the opening end (i.e., the end portion of the first side wall) of the battery case is crimped with respect to the second side wall of the sealing plate with a gasket interposed therebetween. Therefore, not only when using stainless steel as a material of the sealing plate but also when using a steel material, which is comparatively low in strength, the deformation of the sealing plate which may occur in the crimping process can be significantly suppressed. In addition, since the deformation of the sealing plate which may occur in the sealing plate-preparing process and in the crimping process is small in amount, even when using a material with plating applied to its surface, separation of and cracks in the plating layer are unlikely to occur. Therefore, the occurrence of rust can be effectively prevented.

In one preferred embodiment of the present invention, the sealing plate is made of common steel. The use of common steel, as compared with stainless steel, can remarkably reduce the production cost of the coin battery.

On the other hand, the battery case is preferably made of stainless steel. Because of the potential difference between at the positive electrode and at the negative electrode, the battery case will more easily corrode than the sealing plate.

For example, when the coin battery of the present invention includes an organic electrolyte, the negative electrode preferably includes lithium or a lithium alloy. When the negative electrode includes lithium or a lithium alloy, the battery voltage reaches approximately 3 V. If the battery case is made of common steel, the battery case tends to corrode due to oxidation.

The outer radius R1 of curvature of the first curved portion of the sealing plate is preferably 0.3 to 0.5 mm, because this can more widely disperse the pressure applied in the crimping process, and thus can significantly suppress the deformation of the sealing plate. When R1 is 0.3 mm or more, the sealing plate can be smoothly processed by pressing. When R1 is 0.5 mm or less, the sealing plate can have a sufficiently large flat portion at its top. This ensures a sufficient area for press-fitting lithium or lithium alloy thereto, which makes it easy to achieve a higher capacity.

Preferably, a sealant having adhesiveness is interposed between the gasket and at least one selected from the first side wall of the battery case and the second side wall of the sealing plate. The presence of such a sealant can enhance the hermeticity of the housing. Note that if the sealing plate is deformed in the crimping process, the sealant is pushed out or displaced from its applied position, reducing the sealing effect. Therefore, it is important to control the ratio: R1/R2 to 0.22 to 1.88.

In the following, a coin battery according to one embodiment of the present invention is described with reference to drawings. It is to be noted, however, that the following embodiments are merely some examples of the present invention, and should not be construed as limiting the technical scope of the present invention.

FIG. 1 is a cross-sectional view of a coin battery according to one embodiment of present invention.

A coin battery 100 includes a housing comprising a battery case 1, a sealing plate 6, and a gasket 5. The battery case 1 is a shallow cylindrical can having a bottom 1a and a first side wall 1b rising from the periphery of the bottom 1a. The sealing plate 6 has a top 6a, and a second side wall 6b extending from the periphery of the top 6a along inside the first side wall 1b of the battery case 1. The gasket 5 is partially interposed between the first side wall 1b of the battery case 1 and the second side wall 6b of the sealing plate 6, thereby to seal the space between the battery case 1 and the sealing plate 6. The gasket 5 has an annular groove to fit the rim of the sealing plate 6.

A material of the gasket 5 is, for example, polypropylene (PP), polyphenylene sulfide (PPS), or polyether ether ketone (PEEK).

A sealant having adhesiveness may be interposed between the gasket 5 and the first side wall 1b, and/or between the gasket 5 and the second side wall 6b. Examples of the sealant include pitch, asphalt, vinyl-type polymer, silicon-based polymer, rubber-based polymer, and fluoropolymer. The sealant may contain mineral oil.

Figure 2:
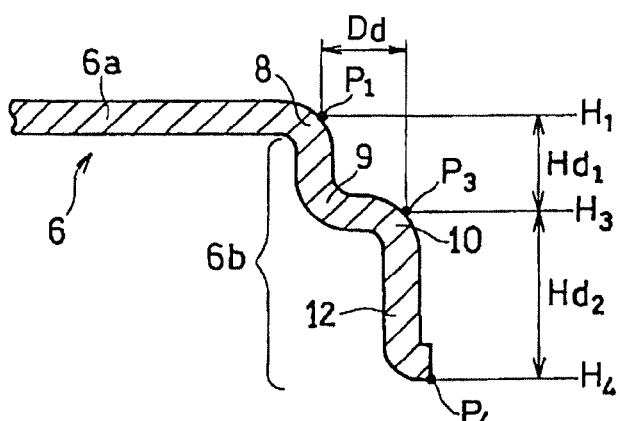

FIG. 2 is a cross-sectional view of an essential part of the sealing plate 6 included in the coin battery 100.

The sealing plate 6 is provided with: a first curved portion 8 formed at the boundary between the top 6a and the second side wall 6b, a second curved portion 9 formed continuously from the first curved portion 8, a third curved portion 10 formed continuously from the second curved portion 9, and a descending portion 12 formed continuously from the third curved portion 10. The difference: $Hd_1$ between a height $H_1$ of a point $P_1$ having the highest curvature of the first curved portion 8 and a height H₃ of a point P₃ having the highest curvature of the third curved potion 10 is, for example, 0.1 to 2.0 mm.

The horizontal distance Dd (distance in the direction parallel to the top 6*a*) between the points P₁ and P₃ is, for example, 0.4 to 1.0 mm. The difference: Hd₂ between the height H₃ and a height H₄ of the lowest point of the descending portion 12 (a point P₄ in FIG. 2) is, for example, 0.2 to 2.5 mm.

The sealing plate 6 is formed such that the ratio: R1/R2 of an outer radius R1 of curvature of the first curved portion 8 to an outer radius R2 of curvature of the second curved portion 9 falls within the range of 0.22 to 1.88. By controlling the R1/R2 ratio within the range of 0.22 to 1.88, the pressure applied to the second side wall 6*b* can be more widely dispersed, when the first side wall 1*b* of the battery case 1 is pushed toward the second side wall 6*b* of the sealing plate 6 with the gasket 5 interposed therebetween. Therefore, the deformation of the sealing plate in the crimping process can be significantly suppressed. The R1/R2 ratio is preferably within the range of 0.30 to 1.50, and more preferably within the range of 0.50 to 1.00 because this can maintain the high capacity and ensure excellent pressure resistance.

When the R1/R2 ratio is higher than 1.88, the second curved portion 9 of the sealing plate 6 tends to be excessively deformed in the inner diameter direction, in the crimping process. Therefore, the gasket 5 and the second side wall 6*b* of the sealing plate 6 tend to have a small gap therebetween, leading to occurrence of leakage. On the other hand, when the R1/R2 ratio is smaller than 0.22, the space between the sealing plate 6 and the first side wall 1*b* of the battery case 1 tends to be excessively reduced, in the crimping process. Accordingly, the gasket 5 is partially forced out from between the first side wall 1*b* and the second side wall 6*b*, and the sealant applied onto the surface of the gasket is displaced, and consequently, the sealing effect is reduced.

Figure 3:
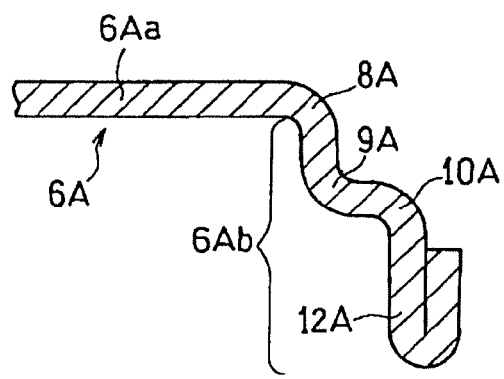

The shape of the sealing plate 6 is not limited to that shown in FIG. 2. FIG. 3 is a cross-sectional view of an essential part of another sealing plate. A sealing plate 6A of FIG. 3 is similar to the sealing plate 6 in that: the sealing plate 6A has a top 6A*a*, and a second side wall 6A*b* extending downward from the periphery of the top 6A*a*; and the sealing plate 6A is provided with a first curved portion 8A at the boundary between the top 6A*a* and the second side wall 6A*b*, a second curved portion 9A continued from the first curved portion 8A, a third curved portion 10A continued from the second curved portion 9A, and a descending portion 12A continued from the third curved portion 10A. The difference is in that the end portion of the descending portion 12A is folded toward outside the battery, forming a folded structure. The folded structure can enhance the strength of the second side wall 6A*b* of the sealing plate 6A, and further improve the reliability of the sealed portion.

Next, description is given of a method for producing the coin battery.

The method includes:

the step of preparing a power generation element including a positive electrode, a negative electrode, a separator interposed between the positive electrode and the negative electrode, and an electrolyte;

the step (i) of preparing a cylindrical battery case having a bottom, and a first side wall rising from the periphery of the bottom;

the step (ii) of preparing a sealing plate having a top, and a second side wall extending downward from the periphery of the top;

the step (iii) of preparing a gasket to be at least partially interposed between the first side wall and the second side wall; and the step (iv) of placing the power generation element in the battery case, then closing the opening of the battery case with the sealing plate, and crimping the opening end of the battery case onto the second side wall of the sealing plate, with the gasket interposed therebetween.

In the step (i), for example, a stainless steel plate is drawn into a bottom-closed cylindrical shape, to form the battery case 1. The stainless steel plate preferably has nickel plating at least on the surface facing outside the battery. The thickness of the stainless steel plate is, for example, 0.15 to 0.35 mm.

In the step (ii), for example, a metal plate is pressed, to form a sealing plate having a predetermined shape. Specifically, the metal plate is processed into a shape having: a first curved portion formed at the boundary between the top and the second side wall, a second curved portion formed continuously from the first curved portion, a third curved portion formed continuously from the second curved portion, and a descending portion formed continuously from the third curved portion, in which the ratio: R1/R2 of an outer radius R1 of curvature of the first curved portion to an outer radius R2 of curvature of the second curved portion is 0.22 to 1.88. The R1/R2 ratio can be controlled by changing the shape of the dies used for pressing, the pressing pressure, and others.

The metal plate used for the sealing plate may be a stainless steel plate, but in view of the production cost, it is preferably a less expensive steel plate such as common steel and carbon steel. The metal plate used for the sealing plate preferably has nickel plating at least on the surface facing outside the battery. The thickness of the metal plate is, for example, 0.10 to 0.40 mm.

Here, common steel is steel designated as SS, SM, SPCC, or the like in the Japanese Industrial Standard (JIS). Carbon steel refers, among special steels, not to steel for special use represented by high alloy steel such as stainless steel (SUS), but to steel material such as S10C, S20C, S30C, S45C, and S55C; and is categorized as alloy steel for machine structure. Particularly preferred for the sealing plate is carbon steel because it is inexpensive and is highly resistant to processing and corrosion.

The thickness of the nickel plating layer to be applied onto the constituting material of the battery case or sealing plate is preferably 0.5 μm to 8 μm, and more preferably 1 μm to 4 μm. When the nickel plating layer is too thin, the antirust effect is weakened, and conversely, when too thick, the antirust effect is kept unchanged, but the production cost is increased. Preferably, the material with nickel plating applied thereto is subsequently subjected to heating. The temperature of heating is, for example, 200 to 700° C.

By controlling the R1/R2 ratio to 0.22 to 1.88, even when common steel with comparatively low strength is used as the material for the sealing plate, the amount of deformation of the sealing plate in the crimping process can be sufficiently reduced. Therefore, even when nickel plating is applied to the steel plate, the separation of and cracks in the nickel plating layer is unlikely to occur. As such, even when the nickel plating layer is comparatively thin (e.g., 0.5 to 1.0 μm), the antirust effect is unlikely to be reduced.

In the step (iv), that is, in the step of fabricating a battery, including the crimping process, first, the power generation element is placed into the battery case, and the gasket is placed along the inside of the first side wall of the battery case. Then, the sealing plate is mounted so as to close the opening of the battery case, and then, the end portion of the first side wall is folded inward. This compresses the gasket, to bring the lower end portion of the gasket into intimate contact with the bottom of the battery case, and bring the upper end portion of the gasket into intimate contact with the second side wall of the sealing plate. As a result, the interior of the battery case is hermetically closed.

Next, the power generation element is described with reference to FIG. 1.

The power generation element includes a positive electrode 2, a negative electrode 3, a separator 4, and an electrolyte (not shown). A current collector 14 is disposed between the positive electrode 2 and the bottom 1a of the battery case 1.

The positive electrode 2 is a coin-shaped pellet formed by compacting a positive electrode material mixture including a positive electrode active material, an electrically conductive additive, and a binder. The positive electrode active material may be of any kind without limitation, and is, for example, an oxide or a composite oxide containing at least one selected from the group consisting of transition metals such as manganese, cobalt, nickel, magnesium, copper, iron, and niobium (e.g., manganese dioxide). Another example of the positive electrode active material is a lithium-containing composite oxide containing at least one selected from the group consisting of metals such as manganese, cobalt, nickel, magnesium, copper, iron, and niobium (e.g., $LiCoO_2$). Yet another example thereof is graphite fluoride. These positive electrode active materials may be used singly, or in combination of two or more.

Examples of the conductive additive include carbon black such as acetylene black and Ketjen black, and graphites such as artificial graphite. These conductive additives may be used singly, or in combination of two or more.

Examples of the binder include: fluorocarbon resins, such as polytetrafluoroethylene (PTFE), polyvinylidene fluoride (PVDF), modified products of PVDF, tetrafluoroethylene-hexafluoropropylene copolymer (FEP), tetrafluoroethylene-perfluoroalkyl vinyl ether copolymer (PFA), and vinylidene fluoride-hexafluoropropylene copolymer; styrene-butadiene rubber (SBR); modified acrylonitrile rubber; and ethylene-acrylic acid copolymer. These binders may be used singly, or in combination of two or more.

The negative electrode 3 is, for example, lithium metal or a lithium alloy shaped like a coin. Examples of the lithium alloy include Li—Al alloy, Li—Sn alloy, Li—Si alloy, and Li—Pb alloy. The negative electrode 3 may be a pellet formed by compacting a negative electrode material mixture including a negative electrode active material and a binder. The negative electrode active material may be of any kind without limitation, and is, for example: a carbon material, such as natural graphite, artificial graphite, and non-graphitizable carbon; and a metal oxide, such as silicon oxide, lithium titanate, niobium pentoxide, and molybdenum dioxide. As for the binder, those exemplified for the positive electrode can be used. The negative electrode material mixture may contain an electrically conductive additive.

When using the positive and negative electrodes as described above, a preferable electrolyte is an organic electrolyte. The organic electrolyte is composed of a non-aqueous solvent and a solute (salt) dissolved therein. The concentration of the solute in the electrolyte is preferably 0.3 to 2.0 mol/L.

Examples of the non-aqueous solvent include: cyclic carbonic acid esters, such as propylene carbonate, ethylene carbonate, butylene carbonate, and vinylene carbonate; chain carbonic acid esters, such as dimethyl carbonate, diethyl carbonate, and methyl ethyl carbonate; ethers, such as 1,2-dimethoxyethane, diglyme (diethylene glycol methyl ether), triglyme (trienthylene glycol dimethyl ether), tetraglyme (tetraethylene glycol dimethyl ether), 1,2-dimethoxyethane, 1,2-diethoxy methane, and tetrahydrofuran. These may be used singly, or in combination of two or more.

Examples of the solute include $LiBF_4$, $LiPF_6$, $LiAsF_6$, $LiSbF_6$, $LiClO_4$, $LiCF_3SO_3$, $LiC_4F_9SO_3$, $LiN(CF_3SO_2)_2$, and $LiN(C_2F_5SO_2)_2$.

The separator 4 may be of any material that can prevent short-circuiting between the positive electrode 2 and the negative electrode 3, but is preferably of a material that is highly electrolyte permeable and less resistant to ion migration. Examples of such a material include woven fabric, nonwoven fabric, and microporous film made of, for example, polyolefin, polyester, polycarbonate, polyacrylate, polymethacrylate, polyamide, polytetrafluoroethylene, polyvinylidene fluoride, polysulfone, polyethersulfone, polybenzimidazole, polyether ether ketone, and/or polyphenylene.

EXAMPLES

The present invention is specifically described below by way of Examples. The following Examples, however, should not be construed as limiting the present invention. In Examples, coin batteries having a structure as illustrated in FIG. 1 were produced.

(i) Battery Case

For the battery case 1, a stainless steel plate (SUS430, thickness: 200 μm) having a 3-μm-thick nickel plating layer on its surface was used. The stainless steel plate was drawn into a bottom-closed cylindrical shape in which the bottom was 20 mm in diameter and the first side wall 1b was 2.8 mm in height.

(ii) Sealing Plate

A plurality of the sealing plates 6 differing in the outer radius R1 of curvature of the first curved portion 8 and the outer radius R2 of curvature of the second curved portion 9 were produced.

Here, a carbon steel plate (thickness: 200 μm) as a steel material having a 3-μm-thick nickel plating layer on its surface was used. The steel plate was pressed into a predetermined shape in which the top 6a was 17 mm in diameter. The difference: $Hd_1$ between a height $H_1$ of a point $P_1$ having the highest curvature of the first curved portion 8 and a height $H_3$ of a point $P_3$ having the highest curvature of the third curved potion 10 was set to 0.9 mm. The horizontal distance: Dd between the points $P_1$ and $P_3$ was set to 0.6 mm. The difference: $Hd_2$ between the height $H_3$ and a height $H_4$ of the lowest point of the descending portion 12 was set to 1.3 mm.

R1 was set to 0.30 mm, 0.40 mm, or 0.50 mm.

R2 was varied within the range of 0.16 to 2.00 mm (Examples 1 to 24), or within the range of 0.10 to 2.00 mm (Comparative Examples 1 to 15).

In Examples 1 to 24, the R1/R2 ratio was controlled between 0.22 and 1.88.

In Comparative Examples 1 to 15, the R1/R2 ratio was controlled between 0.15 and 5.00.

The combination of R1 and R2, and the R1/R2 ratio are shown in Table 1.

(iii) Positive Electrode

First, 100 parts by mass of manganese dioxide serving as a positive electrode active material, 7 parts by mass of graphite serving as a conductive additive, and 1 part by mass of polytetrafluoroethylene serving as a binder were mixed to prepare a positive electrode material mixture. Then, the positive electrode material mixture was compacted into a coin-shaped pellet having a diameter of 15 mm and a thickness of 2 mm, as the positive electrode 2.

(iv) Negative Electrode

A 0.6-mm-thick metal lithium foil was punched into a disc having a diameter of 16 mm, as the negative electrode.

(v) Separator

A 300-μm-thick nonwoven fabric made of polypropylene was used as the separator 4.

(vi) Electrolyte

An organic electrolyte was prepared in which $LiClO_4$ was dissolved as a solute at a concentration of 1.0 mol/L in a mixed non-aqueous solvent of 2:1 (volume ratio) propylene carbonate and 1,2-dimethoxyethane.

(vii) Gasket

A polypropylene gasket was used as the gasket 5. The initial thickness of the portion to be interposed between the first side wall 1b and the second side wall 6b was set to 0.3 mm.

(viii) Fabrication of Battery

The gasket 5 with a sealant comprising blown asphalt and mineral oil applied thereto was disposed along the inside of the first side wall 1b of the battery case 1. On the bottom 1a, a current collector made of SUS444 was disposed, and the positive electrode 2 was placed thereon. Next, the separator 4 was placed on the positive electrode 2, and then, the organic electrolyte was injected into the battery case 1. On the other hand, the negative electrode 3 was attached to the inside of the top 6a of the sealing plate 6. Then, the sealing plate 6 was mounted such that the opening of the battery case 1 was closed with the sealing plate 6, and the first side wall 1b was crimped onto the second side wall of the sealing plate, with the gasket 5 interposed therebetween. In that way, a coin battery was completed. The coin battery had a diameter of 20 mm, a thickness of 3.2 mm, and an electric capacity of 225 mAh.

TABLE 1

|  | R1 (mm) | R2 (mm) | R1/R2 | Number of leaked batteries | Number of rusted batteries |
| --- | --- | --- | --- | --- | --- |
| Ex. 1 | 0.30 | 1.20 | 0.25 | 0/100 | 0/100 |
| Ex. 2 | 0.30 | 1.00 | 0.30 | 0/100 | 0/100 |
| Ex. 3 | 0.30 | 0.80 | 0.38 | 0/100 | 0/100 |
| Ex. 4 | 0.30 | 0.60 | 0.50 | 0/100 | 0/100 |
| Ex. 5 | 0.30 | 0.40 | 0.75 | 0/100 | 0/100 |
| Ex. 6 | 0.30 | 0.20 | 1.50 | 0/100 | 0/100 |
| Ex. 7 | 0.30 | 0.16 | 1.88 | 0/100 | 0/100 |
| Ex. 8 | 0.40 | 1.80 | 0.22 | 0/100 | 0/100 |
| Ex. 9 | 0.40 | 1.60 | 0.25 | 0/100 | 0/100 |
| Ex. 10 | 0.40 | 1.40 | 0.29 | 0/100 | 0/100 |
| Ex. 11 | 0.40 | 1.20 | 0.33 | 0/100 | 0/100 |
| Ex. 12 | 0.40 | 1.00 | 0.40 | 0/100 | 0/100 |
| Ex. 13 | 0.40 | 0.80 | 0.50 | 0/100 | 0/100 |
| Ex. 14 | 0.40 | 0.60 | 0.67 | 0/100 | 0/100 |
| Ex. 15 | 0.40 | 0.40 | 1.00 | 0/100 | 0/100 |
| Ex. 16 | 0.50 | 2.00 | 0.25 | 0/100 | 0/100 |
| Ex. 17 | 0.50 | 1.80 | 0.28 | 0/100 | 0/100 |
| Ex. 18 | 0.50 | 1.60 | 0.31 | 0/100 | 0/100 |
| Ex. 19 | 0.50 | 1.40 | 0.36 | 0/100 | 0/100 |
| Ex. 20 | 0.50 | 1.20 | 0.42 | 0/100 | 0/100 |
| Ex. 21 | 0.50 | 1.00 | 0.50 | 0/100 | 0/100 |
| Ex. 22 | 0.50 | 0.80 | 0.63 | 0/100 | 0/100 |
| Ex. 23 | 0.50 | 0.60 | 0.83 | 0/100 | 0/100 |
| Ex. 24 | 0.50 | 0.40 | 1.25 | 0/100 | 0/100 |
| Com. Ex. 1 | 0.30 | 2.00 | 0.15 | 6/100 | 0/100 |
| Com. Ex. 2 | 0.30 | 1.80 | 0.17 | 5/100 | 0/100 |
| Com. Ex. 3 | 0.30 | 1.60 | 0.19 | 3/100 | 0/100 |
| Com. Ex. 4 | 0.30 | 1.40 | 0.21 | 1/100 | 0/100 |
| Com. Ex. 5 | 0.30 | 0.15 | 2.00 | 3/100 | 2/100 |
| Com. Ex. 6 | 0.30 | 0.10 | 3.00 | 8/100 | 10/100 |
| Com. Ex. 7 | 0.40 | 2.00 | 0.20 | 1/100 | 0/100 |
| Com. Ex. 8 | 0.40 | 0.20 | 2.00 | 4/100 | 1/100 |
| Com. Ex. 9 | 0.40 | 0.16 | 2.50 | 8/100 | 2/100 |
| Com. Ex. 10 | 0.40 | 0.15 | 2.67 | 9/100 | 6/100 |
| Com. Ex. 11 | 0.40 | 0.10 | 4.00 | 13/100 | 12/100 |
| Com. Ex. 12 | 0.50 | 0.20 | 2.50 | 1/100 | 2/100 |
| Com. Ex. 13 | 0.50 | 0.18 | 2.78 | 8/100 | 5/100 |
| Com. Ex. 14 | 0.50 | 0.16 | 3.13 | 11/100 | 9/100 |
| Com. Ex. 15 | 0.50 | 0.10 | 5.00 | 17/100 | 16/100 |

[Evaluation]

Two hundred coin batteries each were produced for Examples 1 to 24 and Comparative Examples 1 to 15.

(Number of Leaked Batteries)

With respect to 100 batteries each, vibration test and thermal shock test were performed, to check for the presence or absence of leakage. First, vibration test was performed by applying a 200-Hz vibration for 1 hour in each of three directions: X, Y and Z. Subsequently, 360 cycles of thermal shock test was preformed, one cycle of which consisted of exposure at −60° C. for one hour and at 60° C. for one hour. Thereafter, the number of batteries in which leakage occurred was counted. The results are shown in Table 1.

(Number of Rusted Batteries)

With respect to 100 batteries each, storage test was performed by storing batteries in a high-temperature and humid environment of 60° C./90% RH. Thereafter, the batteries after storage were checked for their appearance, and the number of batteries in which rust occurred was counted. The results are shown in Table 1.

As shown in Table 1, as a result of vibration test and thermal shock test, the batteries of Comparative Examples 1 to 15 had leakage of such a level as not to affect the battery characteristics. On the other hand, no leakage occurred in the batteries of Examples 1 to 24. This shows a significant improvement in the reliability of the coin batteries.

In the batteries of Comparative Examples 5, 6 and 8 to 15, the sealing plate and the gasket had a small gap therebetween resulted from an excessive deformation of the second curved portion of the sealing plate in the inner diameter direction that occurred in the crimping process. A very small amount of electrolyte caught in the gap is considered to have leaked outside, predominantly during the vibration test.

In the batteries of Comparative Examples 1 to 4 and 7, due to an increased R2 of the second curved portion of the sealing plate, the space between the sealing plate and the battery case was reduced in the crimping process, and the gasket was partially forced out of the space. The sealant applied to the surface of the gasket was displaced as the gasket was forced out, and presumably because of this, the sealing effect was reduced.

No rust occurred in the batteries of Examples 1 to 24, whereas rust was observed on the surface of the sealing plate in the batteries of Comparative Examples 5, 6 and 8 to 15. So, the condition of the plating layer of the sealing plate around the sealed area was analyzed. As a result, in the sealing plates of the batteries of Examples 1 to 24, no crack in the nickel plating was observed. On the other hand, in the sealing plates of the batteries of Comparative Examples 5, 6 and 8 to 15, partial cracks in the nickel plating layer resulted from the occurrence of deformation in the crimping process were observed around the first curved portion 8.

The foregoing shows that, according to the present invention, it is possible to prevent a slight deformation of the sealing plate which may occur in the crimping process, and significantly improve the reliability on the leakage resistance and antirust effect of the coin battery. Moreover, it is also possible to suppress the displacement of the sealant due to forcing-out of the gasket.

INDUSTRIAL APPLICABILITY

According to the present invention, by using an inexpensive steel material for a sealing plate of the coin battery, it is possible to considerably reduce the production cost, as well as to prevent leakage from the battery due to deformation of the sealing plate, and in addition, to significantly improve the reliability on the antirust effect during storage. Therefore, the coin battery of the present invention is useful for various applications.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: Battery case, 1a: Bottom, 1b: First side wall, 2: Positive electrode, 3: Negative electrode, 4: Separator, 5: Gasket, 6: Sealing plate, 6a: Top, 6b: Second side wall, 8: First curved section, 9: Second curved section, 10: Third curved section, 12 and 12A: Descending portion

The invention claimed is:

1. A coin battery comprising: a power generation element including a positive electrode, a negative electrode, a separator interposed between the positive electrode and the negative electrode, and an electrolyte; and a housing accommodating the power generation element, the housing comprising:
a cylindrical battery case having a bottom, and a first side wall rising from a periphery of the bottom;
a sealing plate having a top, and a second side wall extending from a periphery of the top and along inside the first side wall; and
a gasket at least partially interposed between the first side wall and the second side wall,
the sealing plate being made of common steel and being provided with:
a first curved portion formed at a boundary between the top and the second side wall,
a second curved portion formed continuously from the first curved portion,
a third curved portion formed continuously from the second curved portion, and
a descending portion formed continuously from the third curved portion,
a ratio: R1/R2 of an outer radius R1 of curvature of the first curved portion to an outer radius R2 of curvature of the second curved portion being 0.22 to 1.88,
wherein the common steel is one of SS, SM and SPCC as defined by the Japanese Industrial Standard (JIS).

2. The coin battery according to claim 1, wherein the outer radius R1 of curvature is 0.3 to 0.5 mm.

3. The coin battery according to claim 1, wherein a sealant having adhesiveness is interposed between the gasket and at least one selected from the first side wall and the second side wall.

4. The coin battery according to claim 1, wherein the battery case is made of stainless steel.

5. The coin battery according to claim 4, wherein the electrolyte is an organic electrolyte, and the negative electrode includes lithium or a lithium alloy.

* * * * *